United States Patent [19]

Mango

[11] Patent Number: 4,610,750
[45] Date of Patent: Sep. 9, 1986

[54] ULTRASONIC CUT AND SEAL APPARATUS

[75] Inventor: Carmine M. Mango, Brookfield Center, Conn.

[73] Assignee: Branson Ultrasonics Corporation, Danbury, Conn.

[21] Appl. No.: 720,133

[22] Filed: Apr. 5, 1985

[51] Int. Cl.⁴ .................... B29C 65/08; B32B 31/18
[52] U.S. Cl. ............................ 156/510; 156/73.3;
156/88; 156/515; 156/580.2
[58] Field of Search .............. 156/73.1, 73.2, 73.3,
156/580.1, 580.2, 88, 250, 251, 267, 510, 515;
228/1.1

[56] References Cited

U.S. PATENT DOCUMENTS

| | | | |
|---|---|---|---|
| 2,990,616 | 7/1961 | Balamuth et al. | 228/1.1 |
| 3,460,238 | 8/1969 | Christy et al. | 228/1.1 |
| 3,526,554 | 9/1970 | Obeda | 156/73.1 |
| 3,627,192 | 12/1971 | Killingsworth | 228/1.1 |
| 3,718,272 | 2/1973 | Eltzroth et al. | 228/1.1 |
| 3,852,144 | 12/1974 | Parry | 228/1.1 |
| 4,496,407 | 1/1985 | Lowery, Sr. | 156/73.3 |
| 4,531,999 | 7/1985 | Persson et al. | 156/580.2 |

Primary Examiner—Michael Wityshyn
Attorney, Agent, or Firm—Philip J. Feig; Ervin B. Steinberg

[57] ABSTRACT

An ultrasonic cut and seal apparatus comprises a resonator having a removable tip which includes an inclined bore through which a filament is fed to the output surface of the resonator and upon the sheet material to be cut and sealed. The bore accurately guides the filament to the cut and seal region for causing the filament to be fused with the sheet material in the region adjoining the cut. The cutting and sealing is effected by the combination of an anvil exhibiting a cutting surface and at least one tapered sealing surface disposed opposite the output surface of the resonator when the sheet material is fed through the nip between the anvil and the resonant resonator.

5 Claims, 6 Drawing Figures

FIG. 2
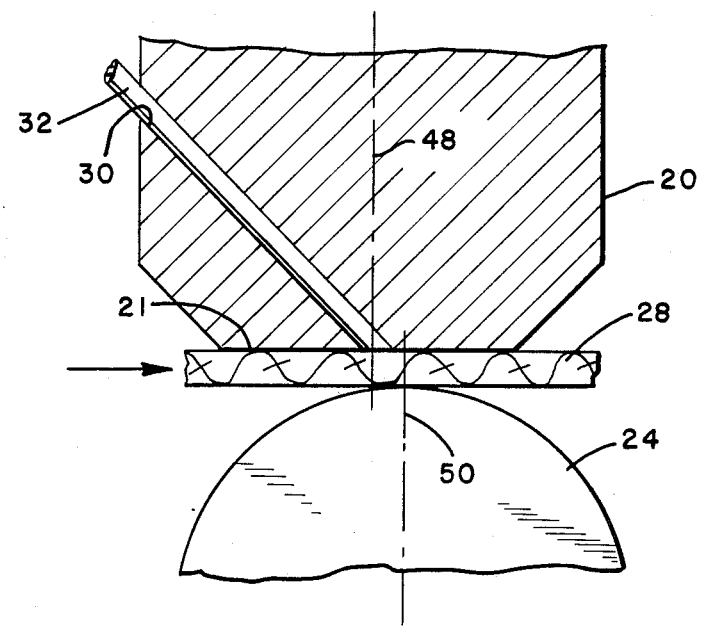
FIG. 3
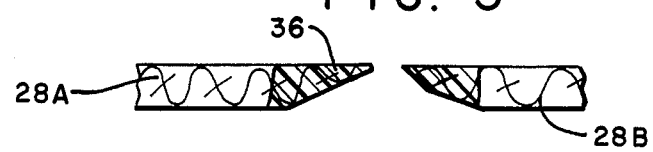
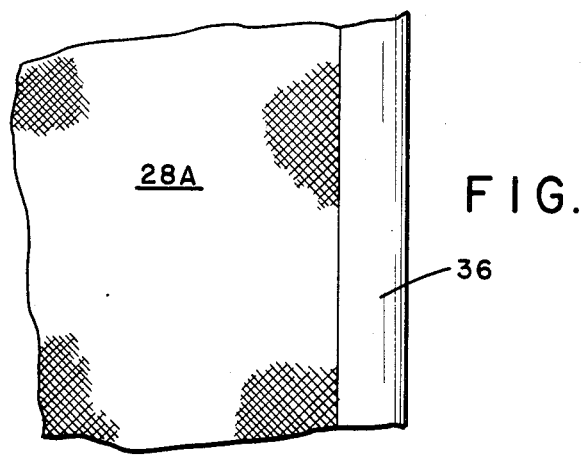
FIG. 4

ULTRASONIC CUT AND SEAL APPARATUS

BRIEF SUMMARY OF THE INVENTION

This invention refers to an ultrasonic cut and seal apparatus and more specifically refers to an ultrasonic cut and seal apparatus for textile sheet material which is fed in a continuous pass through a cut and seal station for providing simultaneously a cut and a sealed edge to prevent the unravelling of threads or the existence of a frayed edge.

This invention, moreover, refers to an improved apparatus disclosed in copending U.S. Patent Application Ser. No. 677,605, filed Dec. 3, 1984 in the name of Gary N. Flood, entitled "Ultrasonic Seal and Cut Method and Apparatus, now U.S. Pat. No. 4,560,427." In the patent application stated, there has been disclosed a method and apparatus for adding a thermoplastic thread or filament to the textile material during cutting and sealing for providing an improved sealed edge. Particularly, the thread or filament added is fused to the textile material in the region adjoining the cut to strengthen the cut edge and improve its appearance. The adding of the filament is particularly suited for textile materials which have an open weave or textile materials which lack a sufficient amount of thermoplastic fiber content to assure a fused edge. These conditions exist when the thermoplastic fiber content is less than 50% or when the material contains primarily natural fibers, such as cotton, etc. The addition of a thermoplastic filament which is fused into the interstices of the weave holds the fibers in place and thus prevents unraveling of the loose fibers at the cut edge. The filament added may be a monofilament or a multifilament, and may be of the same color as the textile material, or alternatively may be of a contrasting color to provide a pleasing appearance of the edge, or may be of a neutral color to blend with the base textile material.

The present invention concerns an improvement in feeding the filament to the area underneath the ultrasonic resonator for contact with the textile material. The filament is relatively thin, yet must be positioned very accurately in the area underneath the ultrasonic horn which is opposed by an anvil having the cutting and sealing surfaces. The present invention describes an arrangement which has been found very satisfactory to provide the desired result. Specifically, the present invention discloses the provision of an inclined bore at the output end of the ultrasonic resonator, the bore extending angularly from the side of the resonator to a terminus at the resonator underside which forms the output surface contacting the sheet material to be cut and sealed. The bore is dimensioned to guide the filament material and to assure that the filament at all times remains disposed accurately in relation to the cut and sealing surfaces of the anvil.

A principal object of this invention, therefore, is the provision of an improved ultrasonic cut and seal apparatus for sheet material.

Another important object of this invention is the provision of an ultrasonic cut and seal apparatus for sheet material wherein a thermoplastic filament is fused to the sheet material in the marginal area adjacent to the cut.

A further and important object of the present invention is the provision of an ultrasonic resonator provided with a bore for feeding and guiding filament material upon the textile material at the region where cutting and sealing of the textile material is to occur.

Still further and other objects of this invention will become more clearly apparent by reference to the following description when taken in conjunction with the accompanying drawings.

BRIEF DESCRIPTION OF THE DRAWINGS

FIG. 2 is an enlarged view of the tip of the resonator with a filament being fed upon the textile sheet material;

FIG. 3 is a schematic representation of the sheet material after being cut and sealed at the edges;

FIGS. 4 is an enlarged representation of the textile material after being cut, showing sealing in the marginal area adjacent to the cut;

DETAILED DESCRIPTION OF THE INVENTION

Figure 1:
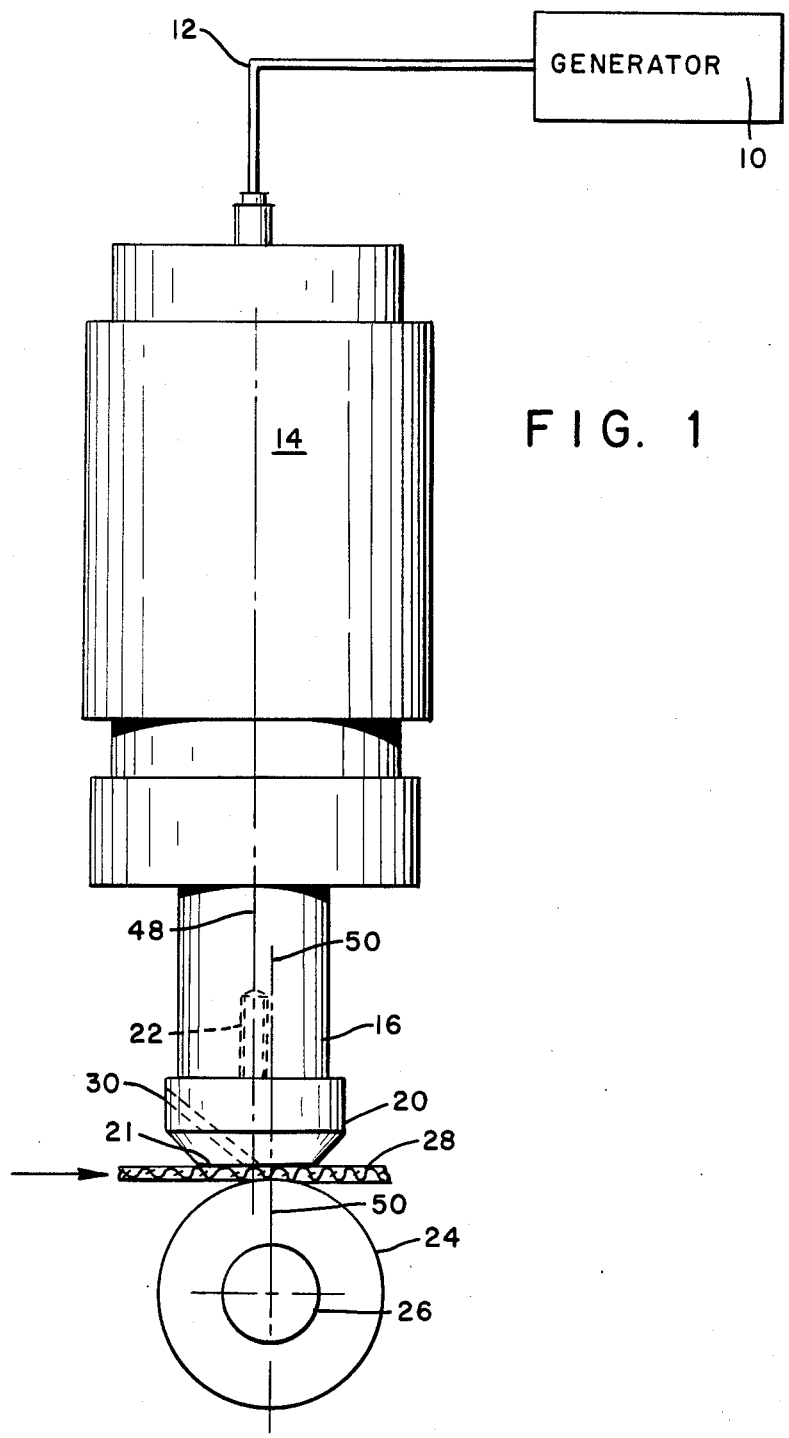
FIG. 1 is a schematic view of the ultrasonic cut and seal apparatus.

Refering now to the figures and FIG. 1 in particular, there is shown an electrical generator 10 which supplies electrical energy in the high frequency range, typically a frequency above 16 kHz, via conductor 12 to an electroacoustic converter unit 14 which transforms, by means of piezoelectric or magnetostrictive means, the applied electrical energy to mechanical vibrations at an ultrasonic frequency and causes such mechanical vibrations to be manifest at the output surface 21 of an elongated resonator 16, the latter being known also as horn, mechanical amplitude transformer, tool, etc. The resonator applies the ultrasonic energy in the form of high frequency mechanical vibrations to a workpiece which is brought into forced contact with the output surface 21 of the resonator. The resonator 16 is dimensioned to be resonant as a half wavelength resonator at the predetermined frequency of operation. The dimensioning of the resonator 16 is well understood by those skilled in the art, reference being made to the book entitled "Ultrasonic Engineering" by Julian Frederick, John Wiley and Sons, Inc., New York, NY (1965). As shown in FIG. 1 and in a preferred embodiment, the frontal or output end of the resonator 16 includes a removable tip 20 screw fastened to the resonator by a stud 22. The tip 20, as will be readily apparent, is easily replaceable when worn or when a change is required as will be explained in detail hereafter. The tip 20 is provided with a bore 30 which is inclined with respect to the longitudinal axis of the resonator 16 to permit a filament 32 to be fed from the outside of the resonator upon the workpiece 28, typically textile sheet material. The bore terminates at the output surface 21 of the resonator.

FIG. 1, moreover, discloses an anvil wheel 24 which may be rotating or which may be mounted stationary upon a shaft 26. If the resonator 16 is rendered resonant and the sheet material 28 is drawn through the nip between the resonator and the anvil, the sheet material 28 will be cut and sealed in the marginal regions adjacent to the cut responsive to the resonator frontal surface being urged against the anvil by force means, not shown in the present figure. As clearly seen in FIG. 2, the filament 32 of thermoplastic material, either a monofilament or a multifilament, is fed through the bore 30 to the underside of the resonator for becoming fused with the sheet material 28.

FIG. 3 illustrates, in a schematic way, the textile material 28A and 28B after being cut and exhibiting a fused portion 36 in the marginal area adjacent to the cut, the fused area preventing the unraveling of threads.

FIG. 4 more clearly illustrates a loose weave textile material 28A with a fused region 36. Particularly in the present example, the filament material 32 has been added and forced into the interstices of the loose weave textile material and provides a molten mass 36 to eliminate what might otherwise be an insufficiently sealed edge.

Figure 5:
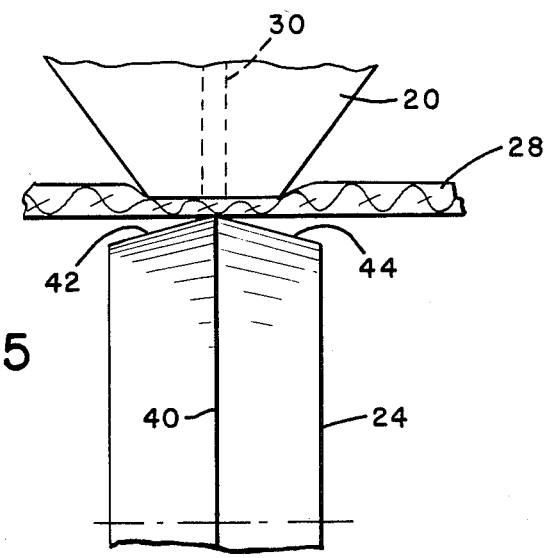
FIG. 5 is a side view showing the bore for feeding the filament, the bore terminating substantially opposite the cutting surface of the anvil.

FIG. 5 illustrates the anvil 24 having a centrally disposed cutting surface 40 and a pair of tapered circumferential surfaces 42 and 44 which constitute the sealing surfaces. The underside 21 of the resonator is plane, and as shown in FIG. 5, the terminus of the bore 30 is disposed opposite the cutting surface 40 for providing substantially equal amounts of filament material to be fused with the textile portions 28A and 28B.

Figure 6:
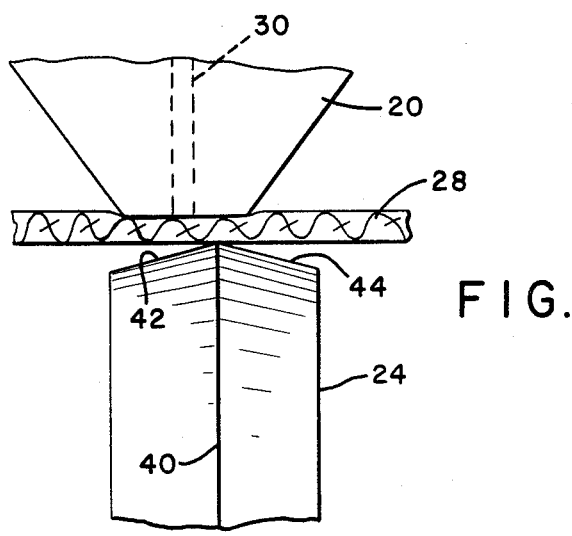
FIG. 6 is a side view similar to FIG. 5, the bore terminating opposite a sealing surface of the anvil.

FIG. 6, in contrast, shows the terminus of the bore to be disposed opposite one of the sealing surfaces of the anvil. This arrangement provides for the case where only one edge of the cut material is to be finished and the other portion becomes scrap.

In a typical application, the filament material 32 is nylon, polypropylene, polyethylene, or polyester material and having a diameter of 0.005 to 0.015 inch (0.13 to 0.4 mm). It will be apparent that in the preferred embodiment the bore 30 is of circular cross-section for receiving a round filament since a bore most easily is provided by conventional drilling techniques. The replaceable tip 20 has the advantage that several tips may be provided in order to accommodate different filament diameters. The filament material is selected depending upon the particular sheet material to be cut and sealed and the size of the filament depends upon the amount of material to be added. The replacement of a tip 20, of course, is far more economical than manufacturing complete resonators.

The bore 30 is dimensioned to suitably guide the filament material 32 which, in a preferred embodiment, is unwound from a roll and may be fed over one or more guide rollers before entering the bore 30 of the resonator 16. The bore guides the filament and assures that the filament is always disposed accurately in relation to the anvil 24, particularly accurately with respect to the cutting and sealing surfaces of the anvil. The effect of this arrangement is a greatly improved end product, i.e., sheet material which has a pleasing and constant appearance.

As seen in FIG. 1, the sheet material is passed through the nip in the direction indicated by the arrow. The fused filament portion adhering to the sheet material 28 causes fresh filament material 32 to be drawn through the bore 30 as the sheet material advances through the nip. Moreover, as seen in FIGS. 1 and 2, the center axis 48 of the resonator 16 is slightly displaced with respect to the axis 50 through the disk shaped anvil for causing the filament 32 to be fed upon the anvil ahead of the point of maximum compression and, hence, the point of maximum power dissipation, i.e., the region where the gap between the output surface 21 and the anvil 24 is a minimum. This arrangement assures that the filament is first fed upon the sheet material and fused into the sheet material subsequently.

While there has been described and illustrated a preferred embodiment of the invention and certain modifications have been described, it will be apparent to those skilled in the art that still further changes and modifications may be made without departing from the scope of the present invention, which shall be limited only by the scope of the appended claims.

What is claimed is:

1. An ultrasonic cut and seal apparatus including an elongated resonator dimensioned to be resonant as a half wavelength resonator for energy of predetermined frequency for providing ultrasonic energy manifest at a planar output surface thereof to a workpiece in contact with said output surface; an anvil disposed opposite said output surface and having a cutting surface and at least one adjacent sealing surface, whereby sheet material fed between said output surface and said anvil is cut and sealed in a marginal region adjacent to the cut in response to being exposed to ultrasonic energy provided by said output surface, the improvement comprising:

said resonator including a bore extending from the side of said resonator angularly inclined relative to the longitudinal axis of said resonator to said output surface for feeding a thermoplastic filament adapted to melt and fuse with the sheet material from a location outside said resonator into the area between said output surface and the sheet material;

the longitudinal axis of said resonator being displaced from the point of maximum compression effective upon sheet material interposed between said anvil and said output surface, and said bore, resonator and anvil being arranged relative to one another to cause the filament to be fed upon the sheet material before the sheet material is cut and the filament is fused with the sheet material.

2. An ultrasonic cut and seal apparatus as set forth in claim 1, said resonator having a removably secured tip containing said output surface and bore.

3. An ultrasonic cut and seal apparatus as set forth in claim 1, said bore terminating on said output surface for feeding the filament to an area substantially opposite said cutting surface of said anvil.

4. An ultrasonic cut and seal apparatus as set forth in claim 1, said anvil being a disk having a peripheral cutting surface and at least one peripheral sealing surface.

5. An ultrasonic cut and seal apparatus as set forth in claim 4, said anvil having a pair of sealing surfaces, one on either side of said cutting surface.

* * * * *